United States Patent

[11] 3,613,509

| [72] | Inventors | Heinz Flaschar<br>Ludwigsburg;<br>Wilhelm Weigert, Schwieberdingen; Walter<br>Werner, Waiblingen; Manfred Kramer,<br>Fellbach-Lindle, all of Germany |
|---|---|---|
| [21] | Appl. No. | 872,671 |
| [22] | Filed | Oct. 30, 1969 |
| [45] | Patented | Oct. 19, 1971 |
| [73] | Assignee | Robert Bosch GmbH<br>Stuttgart, Germany |
| [32] | Priority | Nov. 6, 1968 |
| [33] | | Germany |
| [31] | | P 18 07 173.3 |

[54] ELECTROHYDRAULIC REMOTE CONTROL ARRANGEMENT FOR HYDRAULIC DIRECTIONAL VALVES
13 Claims, 3 Drawing Figs.

[52] U.S. Cl.................................................. 91/459,
91/461, 137/596.16
[51] Int. Cl...................................................... F15b 13/044
[50] Field of Search........................................... 91/459,
275, 361, 363 A, 365, 461, 304; 137/596.12,
596.13, 596.16

[56] References Cited
UNITED STATES PATENTS

| 2,826,896 | 3/1958 | Glaze et al.............. | 91/363 A |
| 3,010,479 | 11/1961 | Foley....................... | 137/596.16 X |
| 3,426,650 | 2/1969 | Jenney..................... | 91/363 A |
| 3,452,645 | 7/1969 | Barltrop................... | 91/363 A |
| 3,489,063 | 1/1970 | Piret......................... | 91/361 X |

*Primary Examiner*—Martin P. Schwadron
*Assistant Examiner*—Irwin C. Cohen
*Attorney*—Michael S. Striker ABSTRACT: An arrangement for controlling directional valves electrohydraulically. The valve is connected between a constant pump and a load which is actuated through fluid under pressure from the pump. The directional valve has a control slide to which a signal transducer is secured to give a signal indicative of the position of the control slide. Control levers are also arranged with the control slide and have signal transducers for indicating the deflection of the control lever from a neutral position. A control circuit is connected to the signal transducers for comparing their signal outputs, and to actuate electrohydraulic positioning member on the control slide for controlling the position of the control slide dependent upon the position of the control lever. A switching valve controls the neutral fluid flow from the pump to the load as a function of the position of the control lever.

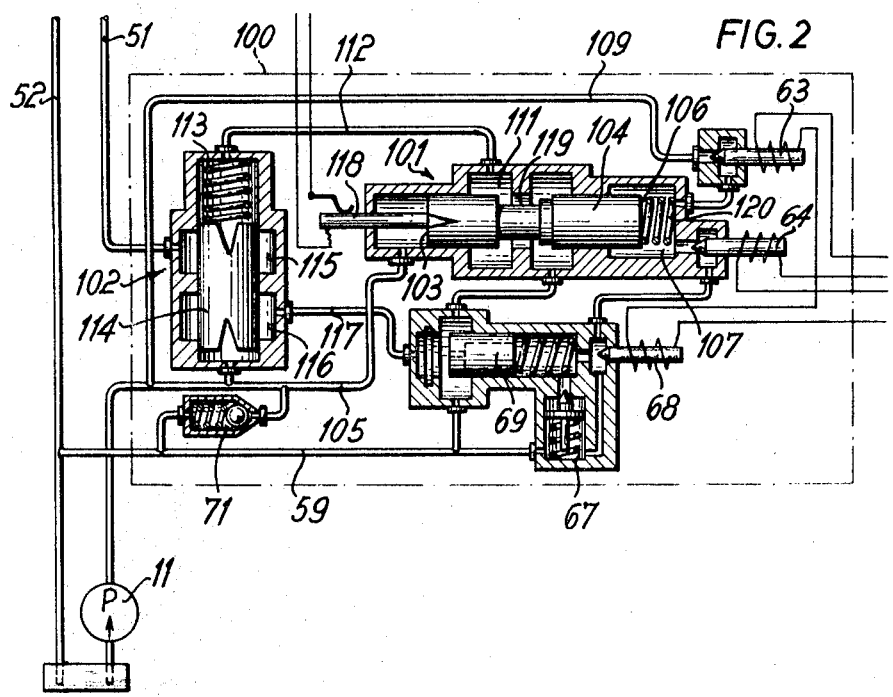
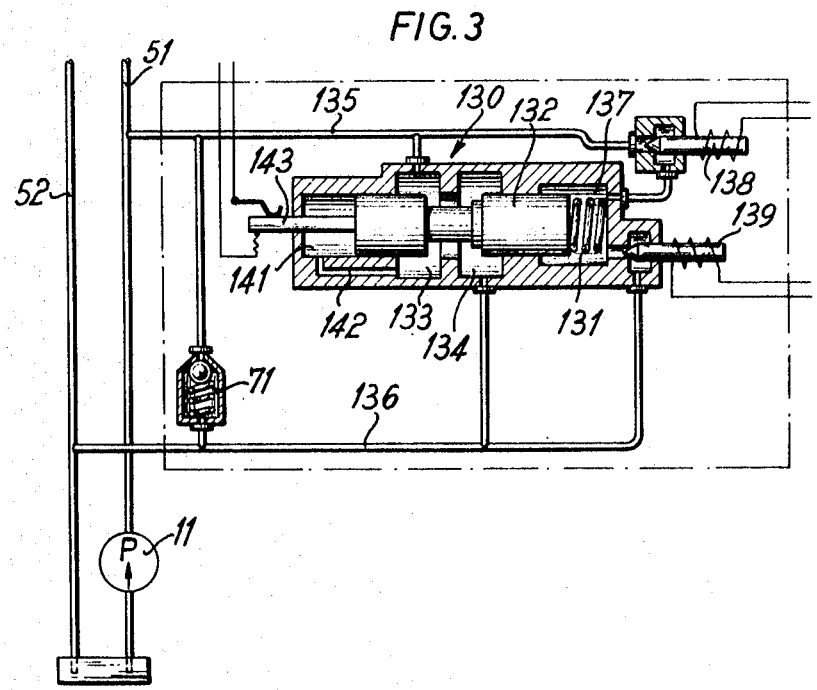

Н,613,509

ELECTROHYDRAULIC REMOTE CONTROL ARRANGEMENT FOR HYDRAULIC DIRECTIONAL VALVES

BACKGROUND OF THE INVENTION

The present invention resides in an arrangement for electrohydraulic control of directional valves which control the pressure flow from a constant pump through an electrohydraulic actuated switching valve controlled by the neutral to the load.

An electrohydraulic arrangement is known in the art in which the position of a load is regulated as a function of a control lever position, with the aid of a servo valve. For this purpose, the hydraulic part has an arrangement in which a bypass valve is connected beyond the constant pump. The bypass valve regulates continuously the pump pressure somewhat above the load pressure with the aid of electrical signal transducers. This arrangement serves solely for the control of one individual load, and shows no directional valve with control slide or spool is either controlled or regulated in accordance with the control lever position. This arrangement known in the art, is limited to a predetermined application in which a position dependent signal generator is arranged at the load. The load dependent control of the bypass valve can hardly by installed in remote controlled arrangements with a plurality of directional valves, in view of the complexity involved. Furthermore, the arrangement known in the art uses expensive or costly servo valves with the accompanying power loss resulting from the control of oil flow.

Accordingly, it is an object of the present invention to provide an arrangement for the electrohydraulic remote control of hydraulic directional valves with feed or supply realized through a constant pump. The arrangement of the present invention is to provide an operable and precise remote control of the control slide and the neutral flow with the simplest means possible, and to have substantially low power losses. The present invention is also to use available components.

The present invention achieves the preceding objects by providing a signal generator at the control slide of at least one directional valve. The signal generator of transducer provides a position-dependent signal. The control lever arranged with the control slide has also a corresponding electrical signal generator or transducer. An electrical control unit is provided through which the signal outputs from the generators or transducers become compared. The electric control unit is operatively connected with an electrohydraulic positioning arrangement at the control slides when these signals being compared coincide. The electrical control unit is also in operative connection with the switching valve in neutral flow conditions and is dependent upon the control lever deflection.

An arrangement as described above with remotely controlled slides or spools is adapted for any desired application, since the load does not require itself a signal generator or transducer. The regulation of the position of the control slide operates precisely so that an errorless fine control is made possible even though simply components are used. The arrangement of the present invention is considerably less than complex than the known arrangement, and is for this reason, less costly.

A particularly advantageous embodiment is realized through regulation of the slide of the switching valve which is controlled through the neutral flow, with the aid of the electrical control unit. Through this design, a particularly effective neutral control is realized.

It is of advantage to provide a pressure-retaining valve with the switching valve for controlling the neutral flow. The pressure-retaining valve throttles a control pressure when an operating lever is deflected. Rapid response of the arrangement is realized, thereby, in all cases. In order to prevent power losses in the neutral position of all control levers, an electromagnetically actuated transfer valve is advantageously connected in parallel with the pressure-retaining valve.

The switching valve may, furthermore, be adapted to the desired requirements through the simple means. Thus, the switching valve may be constructed in the form of a position-dependent controlled slide, through which the total main flow is determined through the maximum deflection of the operating lever. By constructing the switching valve in the form of an adjustable flow-regulating valve, the influence of the load pressure may be avoided.

SUMMARY OF THE INVENTION

An arrangement for the electrohydraulic control of directional valves connected between a constant pump and a load supplied with fluid under pressure from the pump. The directional valve has a control slide to which a signal transducer is arranged for providing a signal which is a function of the position of the control slide. Control levers are, furthermore, arranged with the control slide. The control levers are also provided with a signal transducer which emits a signal dependent upon the position of the control levers. An electronic control circuit is connected to the signal outputs from the signal transducers for comparing the signal outputs, and actuating an electrohydraulic positioning member on the control slide in a manner that the signals from the transducers agree quantitatively. A switching valve is connected to the control circuit for controlling the neutral fluid flow from the pump to the load as a function of the position of the control levers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a functional schematic diagram of a portion of the arrangement of FIG. 1; and FIG. 3 is a functional schematic diagram of another embodiment of the structure shown in FIG. 2.

DESCRIPTION OF THE PREFERRED EMBODIMENTS

Figure 1:
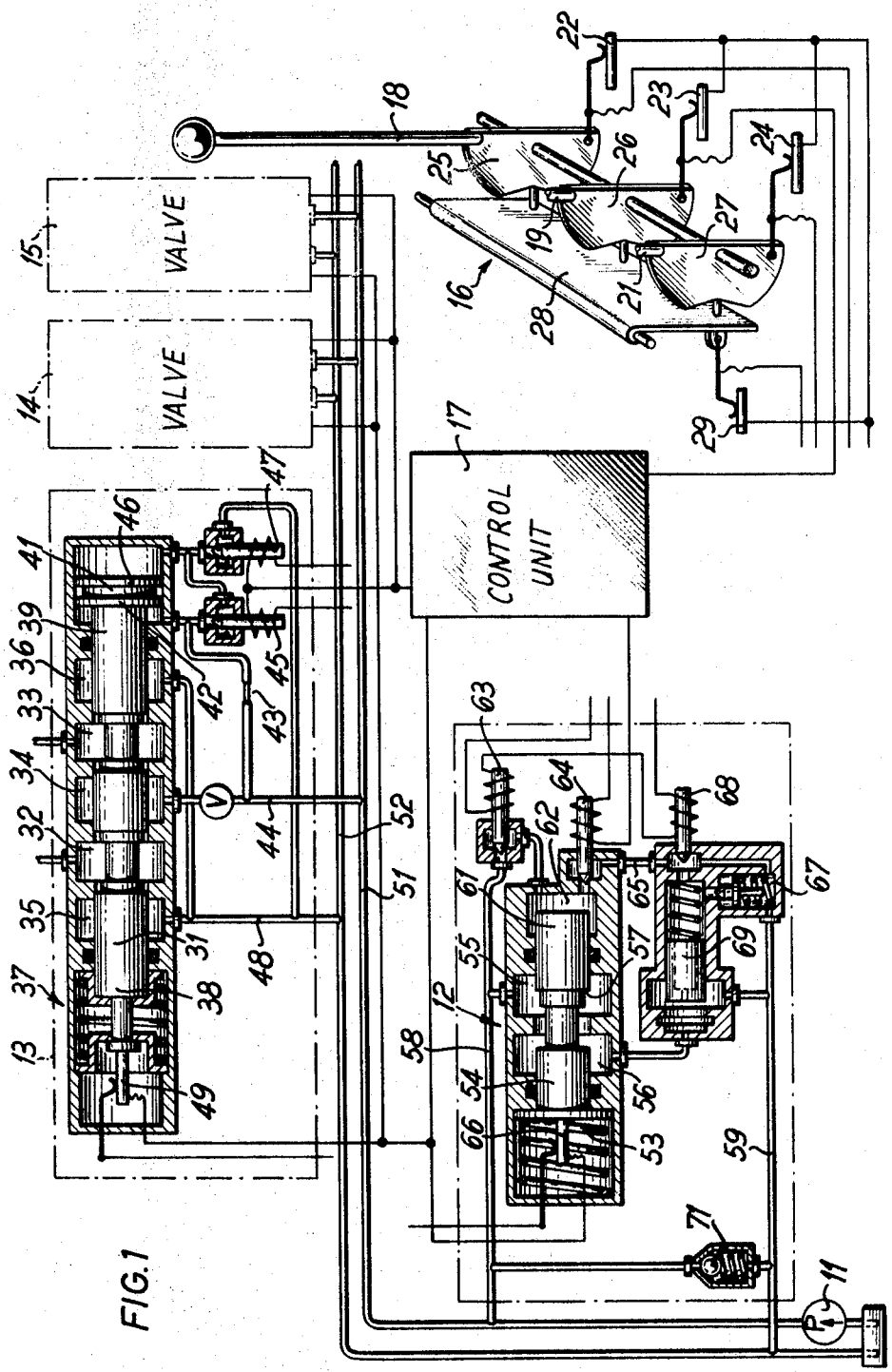
FIG. 1 is a functional schematic diagram if an arrangement for the electrohydraulic remote control of hydraulic directional valves, and with neutral flow control, in accordance with the present invention.

Referring to the drawing, and in particular to FIG. 1, the arrangement therein includes essentially a constant pump 11, an electrohydraulically actuated switching valve 12 for controlling the neutral flow, three identical valves 13, 14 and 15 with electrohydraulic actuation, an operating apparatus 16, an electrical control unit 17, as well as the required hydraulic and electrical connecting lines. The electrical control unit 17 can, of course, be in the form of an electronic control circuit. The term "neutral flow" means the return flow, produced by the pump 11, to the tank (not shown), as distinguished from the flow to the user circuit (load means). The volume of the neutral flow is equal to the entire volume delivered by the pump 11, when the control sliders (slider 31 of valve 13) of the valves 13, 14, and 15 are in their neutral positions. In the present invention, the electrohydraulic switching valve 12 reduces the neutral flow in proportion as the flow to the user circuit is increased by changing the positions of the valves 13, 14, and 15 to a nonneutral position, since the pump 11 constantly delivers. The neutral flow enables the pump 11 to operate with virtually no back pressure as long as no hydraulic fluid is required by the user circuit. In the embodiments shown in FIGS. 1 and 2, the necessary operating pressure for the electrohydraulic control arrangement is obtained by the arrangement of the valves, 69, 68 and 67; whereas in the embodiment shown in FIG. 3, the load pressure operates the control arrangement.

The operating apparatus or operating unit 16 has three control levers 18, 19 and 21 which may be deflected to either side from their neutral position. Each control lever is provided with a signal generator 22, 23 and 24 for the corresponding control slider of the valves 13, 14 and 15. Each control lever has, furthermore, a disk cam 25, 26 and 27 which influences a signal generator 29 for switching valve, through a common lever arrangement 28. All signal generators 22, 23 and 24, 29 are electrically connected with the electrical control unit 17.

Of the three identical valves 13, 14 and 15, only the valve 13 is shown in structural detail for the purpose of maintaining simplicity and clarifying the structure.

The valve 13 has a control slider 31 which blocks, when in the neutral position, two load chambers 32 and 33 against an inflow chamber 34 and two return flow chambers 35 and 36. The control slider 31 is centered in its neutral position through a double-acting return mechanism 37 at the end 38 of the control slider 31. A differential piston 41 is arranged at the other end 39, and the smaller area side 42 of the piston communicates, through an orifice or throttling element 43, with an inflow channel 44. This side 42 of the piston, also communicates with the larger area side 46 of the piston, through an electromagnetic valve 45. The larger side 46 of the piston communicates with a return flow channel 48 through an electromagnetic valve 47. The magnetic coils of both electromagnetic valves 45 and 47 are connected with the electrical control unit 17. An electrical signal generator 49 is, furthermore, at the end of the control slider carrying the return mechanism 37. This electrical signal generator 49 is also connected with the electrical control unit 17.

The inflow channel 44 is the valve 13 connects the inflow chamber 34 with an inflow line 51 originating from the constant pump 11, whereas the return flow channel 48 connects the return flow chambers 35, 36 with a return flow line 52 leading to the storage tank.

THe valves 14 and 15 are similarly connected to the inflow line 51, the return flow line 52, and the electrical control unit 17.

The switching valve 12 is located between the inflow lines for the constant pump 11 to the valves 13, 14 and 15, and the return flow line. The valve 12 has an axial slide 54 subjected, on one side, to a spring 53. The axial slide 54 connects an inflow chamber 55 with a return flow chamber 56, when in its initial or reset position. When moved out of its reset position against the force of the spring 53, this axial slide 54 controls the latter connection through the fine control chambers 57. The inflow chamber 55 connects a first channel 58 with the inflow line 51, and the return flow chamber 56 of a second channel 59 with the return flow line 52. A pressure chamber 62 is arranged at the side of the axial slide 61 lying opposite to the side or end at which the spring 53 is located. This pressure chamber 62 is connected with the channel 58 through a first electromagnetic valve 63. The pressure chamber 62 is, furthermore, connected with the return flow channel 59 through a second identical electromagnetic valve 64 and a channel 65. An electrical signal generator 66 is secured to the axial slide 54 within the space containing the spring 53. This signal generator 66 and space containing the spring 53. This signal generator 66 and the magnetic coils of the electromagnetic valves 63 and 64 are connected to the electrical control unit 17.

A pressure-retaining valve 67 is situated within the channel 59, and a switching valve or transfer 68, which is electromagnetically actuated, is connected in parallel with the pressure-retaining valve 67. These valves 67 and 68 are arranged as precontrolled valves for a common slide 69. THe electromagnetic switching or transfer valves 69 is connected with the electrical control unit 17. A pressure-limiting valve 71 protects the inflow line 51.

In operation, the preset or precontrolled switching valve 68, 69 is opened in the neutral position of all control levers 18, 19 and 21. The axial slide 54, furthermore, is in the position indicated in the drawing, when the control levers 18, 19 and 21 are in their neutral position. Since the valves 13, 14 and 15 prevent fluid flow to the load, the fluid delivered by the constant pump 11 flows into the switching valve 12 where it flows without pressure into the return flow line 52 through the channel 58, the inflow chamber 55, the return flow chamber 56, the channel 59, and the switching valve 68.

When the control lever 18 is moved in any direction, the cam disk 25 actuates, through the lever arrangement 28, the signal generator 29 for the neutral operation. The signal generator 29 first closes the switching valve 68 through the electrical control unit 17. As a result, the pressure-retaining valve 67 throttles the neutral flow to a control pressure which becomes available for actuating the valves 13, 14 and 15, and the switching valve 12.

The signal generator 29 for the neutral flow is continuously compared with the signal generator 66 at the axial slide 54, through the electrical control unit 17. When both signal generators 29 and 66 have identical positions, their quantities coincide, and both electromagnetic valves 63 and 64 are closed as a result of such coincidence. THe axial slide 54, furthermore, is thereby hydraulically blocked. By actuating the control lever 18 and thereby the signal generator 29, the coincidence or balance is upset. The electrical control unit 17 then opens the electromagnetic valve 63, whereas the electromagnetic valve 64 remains closed. The throttled control pressure is now transmitted through the channel 58 and the pressure space 62 onto the axial slide 54. The control pressure thereby forces the axial slide 54 out of its reset or initial position, against the action of the spring 53, so that the axial slide 54 is moved towards the left until the quantities of the signal generators 29 and 66 which are compared by the electrical control unit 17, are in agreement. The axial slide 54 thereby throttles the neutral flow, so that with increasing deflection of the control lever 18, additional fluid flows to the valve 13.

The signal generator 22 at the control lever 18 and the signal generator 49 at the control slide 31 cooperate, in a corresponding manner, through the electrical control unit 17 for the purpose of controlling the electromagnetic valves 45 and 47. When the control lever 18 is deflected towards the right, the signal generator 22 becomes actuated simultaneously with the neutral control flow, and as a result the electrical control unit 17 opens the electromagnetic valve 47. At the same time, the electromagnetic valve 45 remains closed. The pressurized fluid acting upon the smaller area side of the differential piston 41, moves the control slide 31 towards the right, since the larger side 46 of the differential piston 41 is unloaded towards the return flow line 52. Through this motion, the control slide 31 initially connects the inflow chamber 34 with the load chamber 32, through the fine control chambers, and at the same time connects the other load chamber 33 with the return flow chamber 36. The control slide 31 moves thereby towards the right until the position indicated by the signal generator 49 is in agreement with the position indicated by the signal generator 22. When that situation prevails, the electrical control unit 17 closes again the electromagnetic valve 47 and blocks, thereby, hydraulically the control slide 31 into its instantaneous position.

If the control lever 18 is now moved towards the left and returned to its neutral position, the neutral flow becomes again controlled through the switching valve 12 in a corresponding inverse manner, while the control slide 31 controls the connections to and from the load. The electrical control unit 17 thereby opens the electromagnetic valve 64 on the basis of the output signals form the signal generators 29 and 66, whereas the electromagnetic valve 63 remains closed. The spring 53 returns the axial slide or sliding spool 54 into its initial or reset position. The electrical control unit 17 opens, at the same time, the electromagnetic valve 45 on the basis of the signal outputs from the signal generators 22 and 49, whereas the electromagnetic valve 47 remains closed. As a result, the fluid pressure moves the control slide or control spool 31 back into its neutral position due to the differential action of the piston 41. When the control lever 18 attains its neutral position and the signal outputs from the generators 29 and 66 are in agreement or coincide, then the electrical control unit 17 actuates the switching valve 68, whereby the action of the pressure-retaining valve 67 is terminated.

In a corresponding manner, the control slide or spool 31 can also be moved out of its neutral position and towards the left, through the control lever 18.

When together with the directional valve 13, the directional valve 14 becomes simultaneously actuated, the total flow in the line 51 is determined from the directional valve with the largest lever deflection, and this flow becomes distributed to both directional valves, corresponding to the prevailing load pressure and the prevailing position of the fine control bevels or chamfers.

When the electrical arrangement is disconnected, both electromagnetic valves 45 and 47 open, so that a deflected control slide or spool 31 is brought into neutral position through the free action of the differential piston 41 and the double-acting return mechanism. 37. A load becomes thereby hydraulically blocked in its position, for the purpose of avoiding a dangerous situation. At the same time, the electromagnetic valves 63 and 64 of the switching valve 12 become open when the electrical arrangement is disconnected or dropped out, and the electromagnetic valve 68 also becomes thereby opened. Accordingly, neutral flow becomes thereby possible without pressure.

FIG. 2 shows an embodiment of the switching valve in the form of an adjustable flow-regulating valve 100 which is connected in the inflow line 51. Parts in this embodiment which are identical to those in FIG. 1, have identical reference numerals.

The pressure-regulating valve 100 consists itself of an adjustable or displaceable throttle 101 with a pressure balance 102. An inflow channel 105 connects one side 103 of one side of the throttle piston 104, with the inflow line 51. The oppositely lying side 106 acted upon by the spring at the same time, has its pressure space 107 connected with the flow channel 105 through the electromagnetic valve 63 and the channel 109. A channel 112 extends from a space 111 of the adjustable throttle 101, and to the spring chamber 113 of the pressure balance 102 with its slider 114. The latter controls the connection from the spring chamber 113 to a chamber 115, from which the flow line 51 extends further. The slider 114 is, furthermore, acted upon by the side of the flow channel 105 lying opposite to the spring chamber 113, and thereby controls the connection to the chamber 116 which is connected with the switching and pressure-retaining valves 68, 67, 69 through a channel 117.

A signal generator 118 is secured to the throttle piston 104, and is connected with the electrical control unit 17. A control notch 119 at the throttle piston 104 removes the load from the spring chamber 113 of the pressure balance 102 to the channel 59, when the piston 104 is retained in its reset or initial position, through a spring 120. As in the embodiment of FIG. 1, the throttle piston 104 is hydraulically displaceable through the electromagnetic valves 63 and 64.

Similarly, the arrangement of the electromagnetically actuated switching valve 68 and the pressure-retaining valve 67 correspond together with the slide 69 as well as the pressure-limiting valve 71 of the arrangement in FIG. 1.

In the different operation of this construction from that of FIG. 1, the electromagnetic valves 63 and 64 as well as the switching valve 68 are opened, in the neutral position of all control levers 18, 19 and 21. The throttle piston 104 interrupts, when in its reset position, the connection from the inflow channel 105 to the channel 112, and the spring chamber 113 of the pressure balance 102 is unloaded. The pressure flow from the constant pump 11 flows thereby through a branch of the channel 105, the chamber 116 of the pressure balance 102, the channel 117, the slide 69 of the switching valve and the channel 59. The flow finally progresses without pressure into the return flow line 52.

When actuating the control lever 18, the neutral flow is throttled to a control pressure in a manner already described. At the same time, the electronic control unit 17 closes the electromagnetic valve 63 upon comparing the outputs of the signal generators 29 and 118, whereas the electromagnetic valve 64 remains opened. The pressure prevailing on the side 103, now moves the throttle piston 104 towards the right, whereby the displaceable throttle position opens and increases until the outputs of the signal generators 29 and 118 coincide or are in agreement. When this situation has been attained, the electromagnetic valve 64 closes the blocks hydraulically, thereby, the throttle piston 104 into its prevailing or instantaneous position. Through the well-known operation of the pressure balance 102, the fluid from the constant pump 11 is uninfluenced by the load pressure, and flows into the inflow line 51 through the channel 105, the throttle piston 104, the channel 112, the spring chamber 113 of the pressure balance 102, and the chamber 115. The flow in the line 51 is then directed to one of the directional valves which becomes actuated simultaneously with the control of the neutral flow.

In the present construction with flow-regulating valves, a predetermined magnitude for the flow rate accompanies a predetermined control lever position. This relationship is independent of the prevailing load pressure. When two directional control valves are actuated simultaneously, the entire flow becomes distributed between both valves in accordance with the load pressure and position of the fine control bevels or chamfers or rods. When the electrical unit is disconnected or drops out, neutral flow without pressure is also attained.

FIG. 3 shows a further embodiment of the switching valve to which no transfer or pressure-retaining valve is arranged. This switching valve is advantageously adapted for neutral flow control in installations which continuously have a load pressure through a required control pressure.

The switching valve 130 is situated between the inflow line 51 and the return flow line 52. This valve has an axial slide or spool 132 which is subjected to the force of a spring 131 on one side. This axial slide or spool 132 separates an inflow chamber 33 from a return flow chamber 134 when in its initial or reset position. The axial slide 132 has regions of varying cross sections, and controls this connection—initially through fine control bevels—when deflected out of its reset position against the spring 131. The inflow chamber 133 connects a channel 135 with the inflow line 51, whereas the return flow chamber 134 connects a channel 136 with the return flow line 52. A chamber 137 containing the spring 131 is connected with the chamber 133 through a first electromagnetic valve 138. The chamber 137 is also connected with the return flow chamber 134 through a second electromagnetic valve 139. A pressure chamber 141 is situated on the side of the axial slide 132 lying opposite to that of the spring 131. The pressure chamber 141 connects a channel 142 with the inflow chamber 133. An electrical signal generator 143 is secured to the axial slide 132. The signal generator 143 and the electromagnetic valves 138 and 139 are operatively connected to the electrical control unit 17. The pressure-limiting valve 71 secures the constant pump 11.

In the operation of this embodiment, as it differs from that of FIG. 1, the electromagnetic valve 138 is closed and the electromagnetic valve 139 is opened when the control levers 18, 19 and 21 are in their neutral positions. The neutral flow pressure derived from the constant pump 11 acts, through the channel 142, on the axial slide or spool 132 and forces the latter against the force of the spring 131, into the position indicated in the drawing. In this position, the flow from the pump 11 passes into the return flow line 52, through the switching valve 130. The spring 131 and the frontal side of the axial slide 132 are adjusted to each other so that a low neutral flow pressure is realized.

When the control lever 18 is deflected out of its neutral position, the electromagnetic valve 138 becomes opened, and the electromagnetic valve 139 becomes closed. The axial slide 132 compensated for pressure, forces the spring 131 into the reset position, whereby the neutral flow is controlled. This occurs until the signal outputs of the generators 143 and 29 are in agreement or coincide, and as a result, the electromagnetic valve 138 is also closed so that the axial slide 132 is hydraulically blocked or stopped in its prevailing or instantaneous position. With subsequent control of the neutral flow, the electromagnetic valves 138 and 139 are closed or opened.

When the electrical unit drops out or is disconnected, the switching valve also permits a substantially neutral flow without pressure.

In the installations described above, it is of advantage in predetermined cases, to provide two return flow lines separated from each other for the return flow from the load and the return flow of control pressure from the directional control valve. Through such feature, high return flow pressures which may appear, will not influence the electromagnetic valves 45 and 47.

In accordance with the embodiments of FIGS. 1 to 3, the switching valve can also be regulated so that its signal generators 66, 118 do not become compared with the signal generator 29 arranged with all of the control levers. Instead the signal generators 66, 118 may be compared with the signal generators 22, 23 and 24 of the control levers or the signal generator 49 of the control slide 31. For this purpose, the electronic control unit 17 must provide a comparator output value corresponds to the maximum deflection or displacement of one of these parts from its neutral position.

It will be under stood that each of the elements described above, or two or more together, may also find a useful application in other types of constructions differing from the types described above.

While the invention has been illustrated and described as embodied in electrohydraulic control of the directional valves, it is not intended to be limited to the details shown, since various modifications and structural changes may be made without departing in any way from the spirit of the present invention.

What is claimed as new and desired to be protected by Letters Patent is set forth in the appended claims.

1. An arrangement for electrohydraulic control of directional valves comprising, in combination, pump means for pumping fluid under pressure; load means for receiving said fluid from said pump means; at least one directional valve with control slide means and connected between said pump means and said load means; first signal transducer means associated with said control slide means for providing a signal indicative of the position of said control slide means; control lever means movable from a neutral position to nonneutral positions; second signal transducer means operated by said control lever means for providing a signal indicative of the nonneutral position of said control lever means; control circuit means connected to said first and second signal transducer means for comparing said signals from said first and second transducer means; electrohydraulic means associated with said control slide means and operatively connected to said control circuit means for controlling the position of said control slide means in dependence on the position of said control lever means; and switching valve means connected to said control circuit means for controlling neutral fluid flow from said pump means to tank or return means in dependence on the nonneutral position of said control lever means.

2. The arrangement as defined in claim 1 wherein said switching valves means includes pressure-retaining valve means for throttling said neutral flow to obtain a control pressure for operating said switching valve means and said directional valve.

3. The arrangement as defined in claim 2 wherein said switching valve means further includes normally open electromagnetic actuated transfer valve means connected in parallel with said pressure-retaining valve means, said control circuit means being connected to said transfer valve means to close the latter when said control lever means is moved to a nonneutral position.

4. The arrangement as defined in claim 3 including slide means common to both said pressure-retaining valve means and said transfer valve means.

5. The arrangement as defined in claim 1 including slide means in said switching valve means for influencing said neutral fluid flow; third signal transducer means at said slide means in said switching means for providing a signal dependent upon the position of said slide means in said switching means; and electrohydraulic positioning means on said slide means in said switching means and controlled by said control circuit means, the signal from said third transducer means being comparable with the signals from said first and second signal transducer means by said control circuit means.

6. The arrangement as defined in claim 5 including spring means linked to said slide means for maintaining said slide means in a reset position; first channel and second channel means connected through said slide means in said switching valve means when in said reset position; chamfer means on said slide means in said switching means for throttling said connection between said first and second channels when displaced from said reset position, said slide means in said switching means bordering a pressure space; first electromagnetic valve means communicating with said space and said first channel means; and second electromagnetic valves means communicating with said space and said second channel means.

7. The arrangement as defined in claim 6 wherein said third signal transducer means is mounted on the side of said slide means in said switching means linked to said spring means.

8. The arrangement as defined in claim 5 wherein said switching valve means is flow-regulating valve with electrohydraulically controlled piston, said third electrical transducer being secured to said piston for providing an electrical signal dependent upon the position of said piston.

9. The arrangement as defined in claim 8 including pressure-balancing means connected to said piston.

10. The arrangement as defined in claim 8 including spring means abutting said piston.

11. The arrangement as defined in claim 1 including slide means in said switching valve means; spring means abutting said slide means in switching valve means for maintaining said slide means in a reset position; a first chamber and a return flow chamber means separated by said slide means in said switching means when in said reset position; a pressure chamber bordered by said slide means in said switching means and communicating with said first chamber means, said spring means being within a second chamber means; first electromagnetic valve means for connecting said second chamber means with said first chamber means; and second electromagnetic valve means for connecting said second chamber means with said return flow chamber means.

12. The arrangement as defined in claim 1 including separate return flow line means from said load means and said directional valve for return flow of said fluid.

13. The arrangement as defined in claim 5 including fourth signal transducer means at said control lever means for providing a signal representing the maximum deflection of any control lever of a plurality of control levers within said control lever means, the signal from said fourth transducer means being comparable to the signal from said third transducer means through said control circuit means.